United States Patent
Betro' et al.

(10) Patent No.: US 12,469,892 B2
(45) Date of Patent: Nov. 11, 2025

(54) METHOD FOR THE DIAGNOSIS OF THERMAL RUNAWAY IN AN ELECTRIC BATTERY

(71) Applicant: FERRARI S.p.A., Modena (IT)

(72) Inventors: Roberto Betro', Modena (IT); Andrea Benoit Abbiati, Modena (IT); Irene Dona', Modena (IT); Ugo Sitta, Modena (IT); Matias Troncoso, Modena (IT); Elena Ligabue, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 552 days.

(21) Appl. No.: 18/051,601

(22) Filed: Nov. 1, 2022

(65) Prior Publication Data

US 2023/0155196 A1    May 18, 2023

(30) Foreign Application Priority Data

Nov. 12, 2021   (IT) .................... 102021000028814

(51) Int. Cl.
*H01M 10/48*         (2006.01)
*H01M 10/42*         (2006.01)
(Continued)

(52) U.S. Cl.
CPC ....... *H01M 10/482* (2013.01); *H01M 10/425* (2013.01); *H01M 50/204* (2021.01);
(Continued)

(58) Field of Classification Search
CPC .... H01M 10/42; H01M 10/425; H01M 10/48; H01M 10/482; H01M 50/204; H01M 50/51; H01M 2010/4271; H01M 2220/20
(Continued)

(56) References Cited

U.S. PATENT DOCUMENTS 6,037,778 A * 3/2000 Makhija ............... G01R 31/389
                                                324/427
9,847,558 B1 * 12/2017 Wang et al. ........ H01M 50/569
(Continued)

FOREIGN PATENT DOCUMENTS

CN      111913114 A      11/2010
CN      112564240 A       3/2021
WO     2015172947 A1     11/2015

OTHER PUBLICATIONS

Machine translation of CN 111913114 A (Year: 2020).*
(Continued)

*Primary Examiner* — Kevin P Kerns
(74) *Attorney, Agent, or Firm* — CANTOR COLBURN LLP

(57) ABSTRACT

A method for the diagnosis of thermal runaway in an electric battery having at least one stack of electrochemical cells connected to one another in series. The diagnosis method provides for the steps of: measuring a first electric voltage at the ends of each electrochemical cell; measuring a second electric voltage at the ends of the entire stack of electrochemical cells; calculating a difference between the second electric voltage and the sum of all first electric voltages; and diagnosing a thermal runaway of an electrochemical cell, if the first electric voltage of the electrochemical cell is smaller than a first threshold value and if, simultaneously, the difference between the second electric voltage and the sum of all first electric voltages is smaller than a second threshold value.

7 Claims, 4 Drawing Sheets

(51) Int. Cl.
  *H01M 50/204*  (2021.01)
  *H01M 50/51*  (2021.01)
(52) U.S. Cl.
  CPC .... *H01M 50/51* (2021.01); *H01M 2010/4271* (2013.01); *H01M 2220/20* (2013.01)
(58) Field of Classification Search
  USPC .......................................................... 429/7
  See application file for complete search history.

(56) References Cited

U.S. PATENT DOCUMENTS

2013/0119941 A1    5/2013  Moorhead et al.
2021/0190881 A1*   6/2021  Lee et al. ............ H01M 10/633

OTHER PUBLICATIONS

Machine translation of CN 112564240 A (Year: 2021).*
Italian Search Report for Application No. 102021000028814 completed Jun. 30, 2022.
Liao, Z. et al., "A survey of methods for monitoring and detecting thermal runaway of lithium-ion batters," Journal of Power Sources, Elsevier, Amsterdam, NL, vol. 436, Jul. 20, 2019, XP085761281.

* cited by examiner

METHOD FOR THE DIAGNOSIS OF THERMAL RUNAWAY IN AN ELECTRIC BATTERY

CROSS-REFERENCE TO RELATED APPLICATIONS

This patent application claims priority from Italian patent application no. 102021000028814 filed on Nov. 12, 2021, the entire disclosure of which is incorporated herein by reference.

TECHNICAL FIELD

The present invention relates to a method for the diagnosis of thermal runaway in an electric battery.

The present invention is advantageously applied to the diagnosis of thermal runaway in an electric battery composed of lithium-ion electrochemical cells and destined for the automotive, to which the following disclosure will explicitly refer without thereby losing generality.

Patent application CN112564240A describes the control of the battery of a vehicle which detects the onset of a thermal runaway in an electrochemical cell and thus activates a protection device which dissipates the electric energy contained in the electrochemical cell in thermal runaway.

Patent application CN111913114A describes a method for detecting a thermal runaway in an electrochemical cell of a battery by comparing an electric voltage and a temperature of the electrochemical cell with respective information thresholds.

PRIOR ART

Electric batteries composed of lithium-ion electrochemical cells in certain circumstances can develop a phenomenon which is called "thermal runaway" and can potentially be very dangerous. The thermal runaway phenomenon occurs when an initial increase in temperature inside a lithium-ion electrochemical cell creates conditions which cause a further increase in temperature causing a particular case of positive feedback according to which an uncontrolled deviation from the equilibrium conditions of the system is generated. During a thermal runaway, an electrochemical cell can emit an overheated fluid (the so-called "venting") at a high temperature (beyond 500-800° C.); in order to prevent the explosion of the container of the electrochemical cell under the pressure of the overheated fluid generated by the thermal runaway, an electrochemical cell is provided with a calibrated air valve which opens under the pressure so as to make the overheated fluid generated by the thermal runaway pour out towards the outside without arriving at the explosion of the container. However, the outflow of the overheated fluid generated by the thermal runaway from an electrochemical cell can hit the adjacent electrochemical cells triggering a thermal runaway also in the adjacent electrochemical cells thus giving start to an uncontrollable chain reaction ("thermal propagation") which generally leads to the fire of the entire battery.

For these reasons, the approved Chinese standard GB 38031-2020 (entered into force on Jan. 1, 2021) requires, among the other things, a "thermal propagation test" designed for verifying that after the thermal instability of an electrochemical cell in a battery pack, the electrochemical cell will not cause a fire or an explosion of the battery pack for at least five minutes: this allows the passengers to leave the vehicle in case of danger of fire or explosion. In other words, the approved Chinese standard GB 38031-2020 requires diagnosing the "thermal propagation" phenomenon (at least) five minutes before it can become a risk for the passengers of the vehicle, so as to allow the passengers to abandon the vehicle in safety.

DESCRIPTION OF THE INVENTION

The object of the present invention is to provide a method for the diagnosis of thermal runaway in an electric battery, said method allowing diagnosing effectively (i.e. without false negatives) and efficiently (i.e. without false positives) the thermal runaway of an electrochemical cell of the electric battery and, simultaneously, being easy and cost-effective to implement.

According to the present invention, a method for the diagnosis of thermal runaway in an electric battery is provided, according to what claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting embodiment, wherein.

PREFERRED EMBODIMENTS OF THE INVENTION

Figure 1:
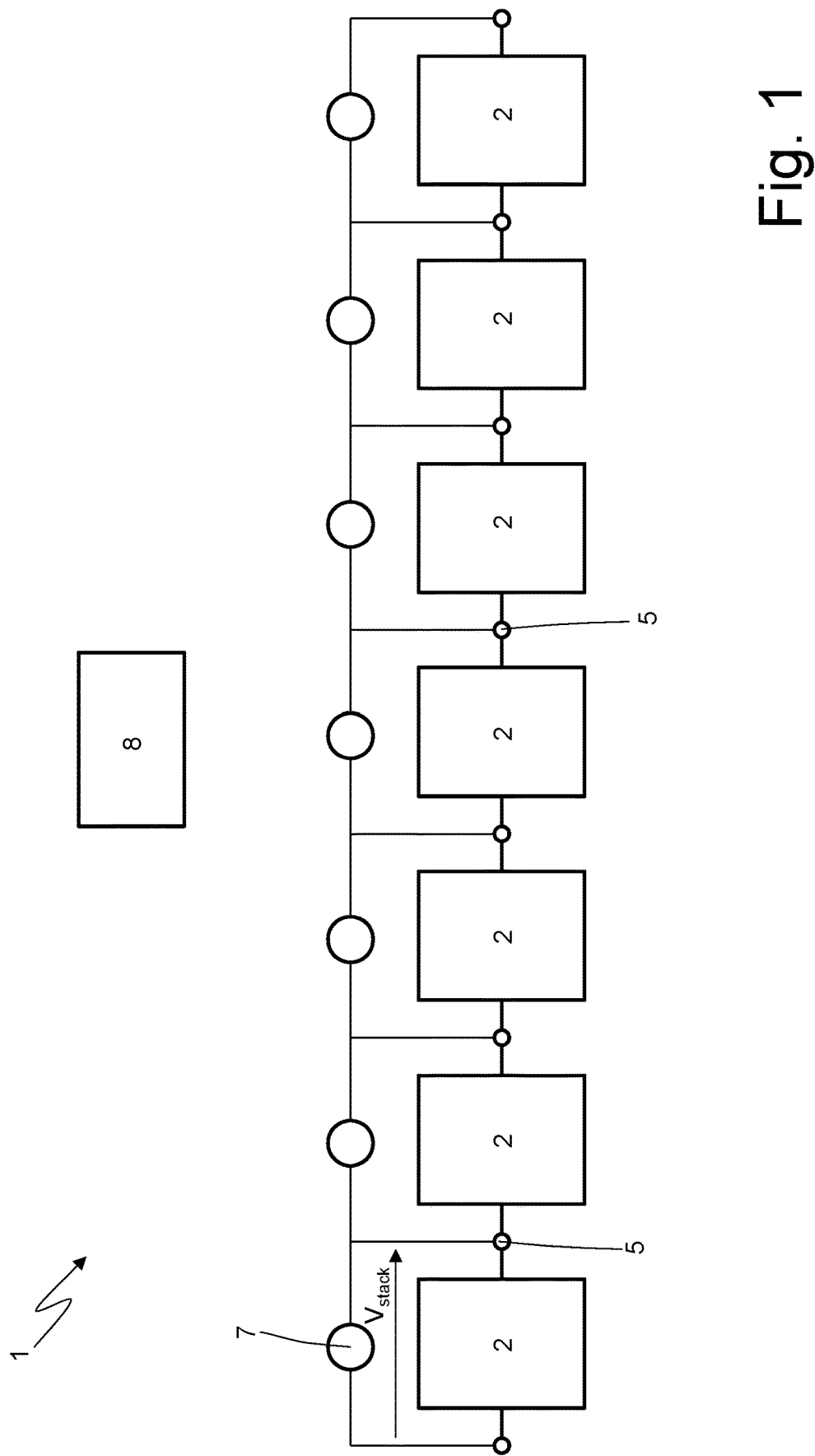
FIG. 1 is a schematic view of an electric battery which is composed of a plurality of stacks connected to one another and wherein the diagnosis method provided in accordance with the present invention is implemented.

In FIG. 1, reference numeral 1 indicates, as a whole, an automotive electric battery (i.e. destined to be installed on board a vehicle).

The battery 1 comprises a plurality of stacks (assemblies) 2 of lithium-ion electrochemical cells 3 (illustrated in FIG. 2) electrically connected to one another; the stacks 2 are all identical to one another, i.e. are all formed by the same number and by the same type of electrochemical cells 3 connected in series. In the embodiment illustrated in FIG. 1, the battery 1 comprises seven stacks 2 all electrically connected to one another in series, but the number of stacks 2 could be different and the stacks 2 could all be electrically connected to one another in parallel or they could be electrically connected to one another in part in series and in part in parallel.

Figure 2:
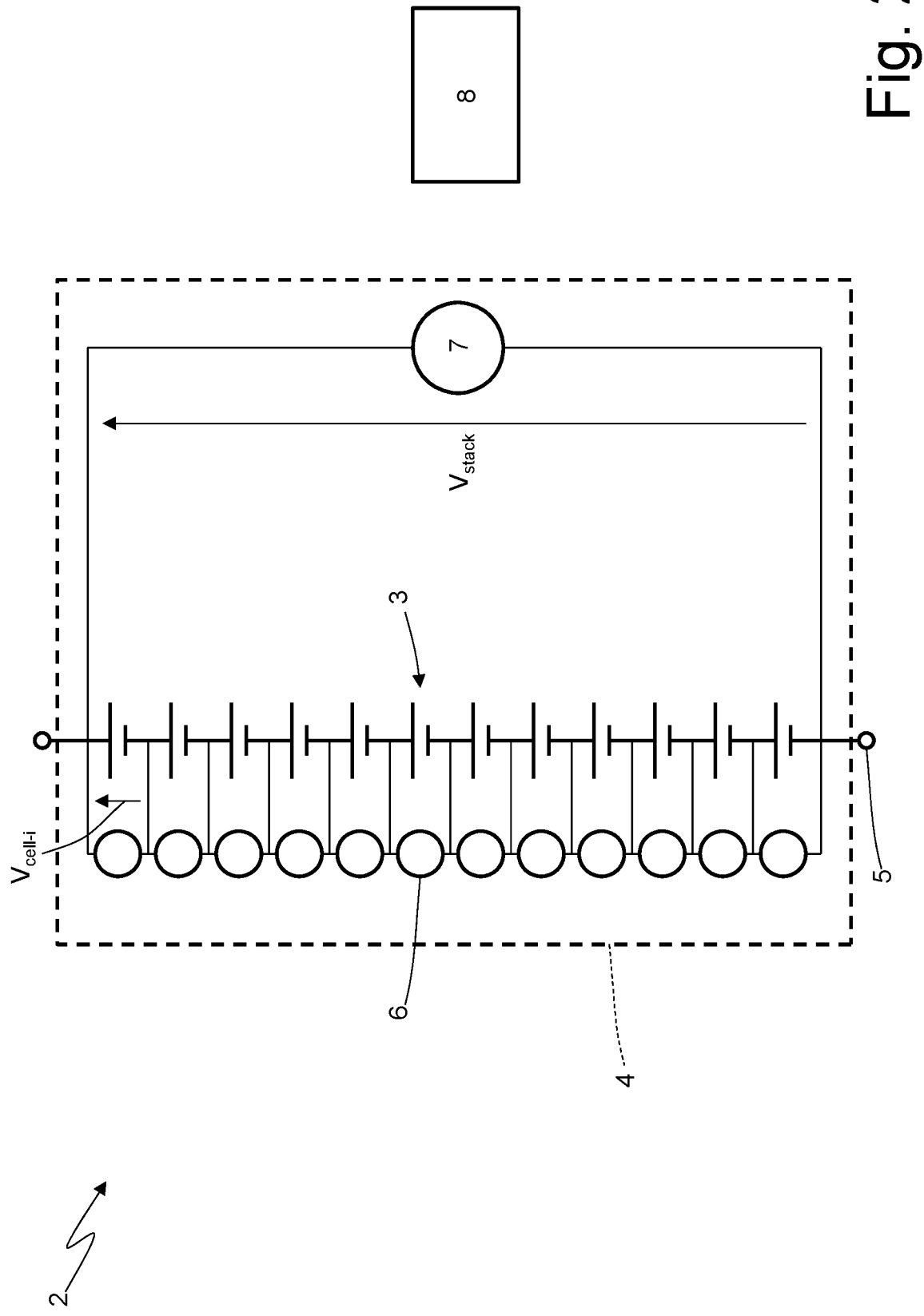
FIG. 2 is a schematic view of a stack of the electric battery of FIG. 1.

According to what is illustrated in FIG. 2, each stack 2 (assembly) comprises a plurality of lithium-ion electrochemical cells 3 which are connected to one another in series and are arranged in a single container 4 from which two terminals 5 of the stack 2 come out. In the embodiment illustrated in FIG. 2, each stack 2 comprises twelve lithium-ion electrochemical cells 3 which are connected to one another in series, but the number of electrochemical cells 3 could be different.

Each stack 2 comprises a plurality of measuring instruments 6 which are configured to measure the electric voltage $V_{cell-i}$ at the ends of each electrochemical cell 3 and are part of the so-called "BMU" ("Battery Management Unit", sometimes also called "Battery Management System") which is a control unit that monitors the state of the lithium-ion electrochemical cells 3 based on their voltage; in particular, the "BMU" manages each stack 2 of lithium-ion electrochemical cells 3 defining a safe operating area (thanks to a careful balancing of the electric voltages between the electrochemical cells 3), i.e. a safety area inside which the stack 2 ensures the best technical and energy performance.

Furthermore, each stack 2 comprises a measuring instrument 7 which is still part of the "BMU" and is configured to measure the electric voltage $V_{stack}$ at the ends of the entire stack 2 of electrochemical cells 3 (i.e. between the terminals 5 of the stack 2) which is given by the sum of the electric voltages $V_{cell-i}$ of all the electrochemical cells 3 which compose the stack 2 and are connected to one another in series.

The battery 1 comprises a control unit 8 which is single and common to all the stacks 2 and reads the measurements carried out by the measuring instruments 6 and 7 of all the stacks 2.

Figure 3:
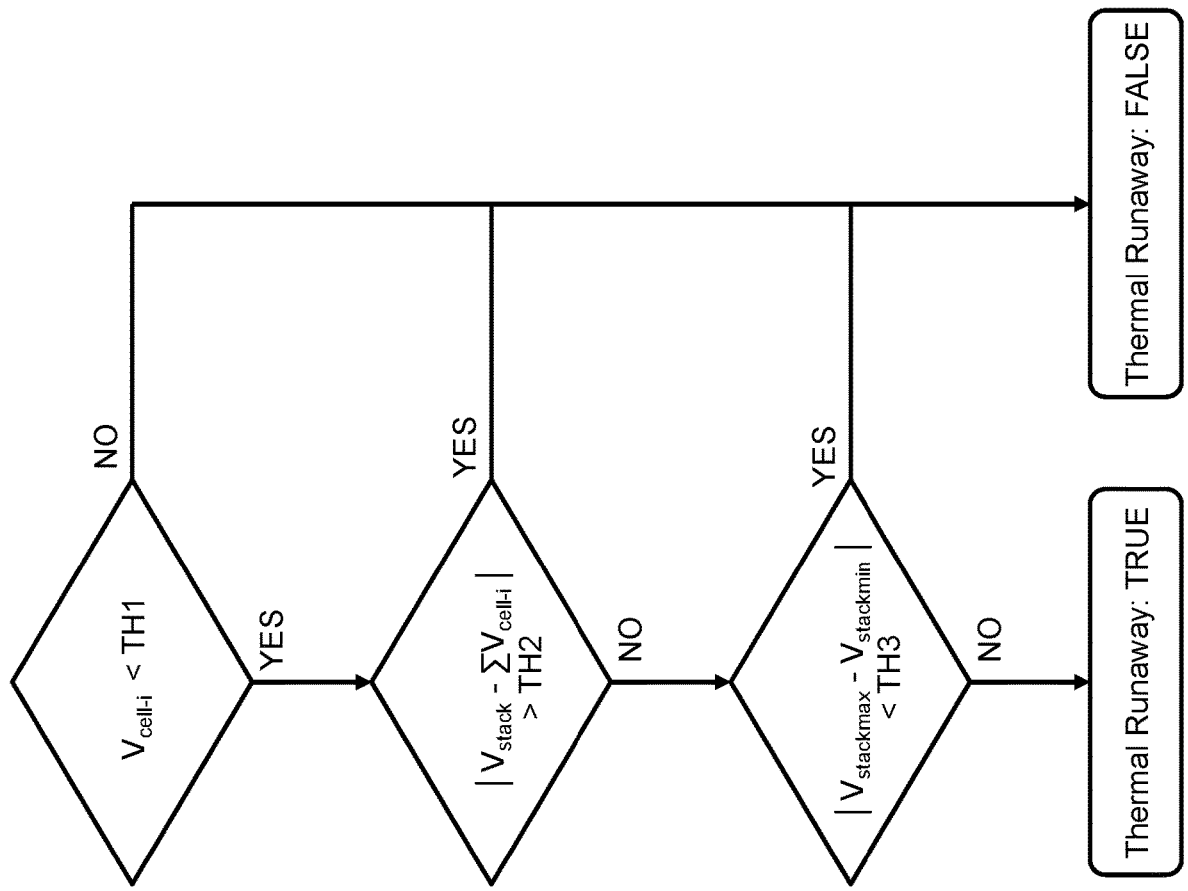
FIG. 3 is a flow diagram which summarises the diagnosis method provided in accordance with the present invention.

According to what is schematised in the flow diagram of FIG. 3, the control unit 8 is configured to diagnose the onset of a possible thermal runaway of an electrochemical cell 3 by combining the electric information (the electric voltages $V_{cell-i}$ and $V_{stack}$) provided by the measuring instruments 6 and 7.

In particular, the control unit 8 cyclically verifies the electric voltage $V_{cell-i}$ of each electrochemical cell 3 of each stack 2 by comparing the electric voltage $V_{cell-i}$ of the electrochemical cell 3 with a threshold value TH1: if the electric voltage $V_{cell-i}$ of an electrochemical cell 3 is smaller than the threshold value TH1, then the control unit 8 diagnoses a possible (not yet certain, since not yet confirmed by the following verifications described in the following) thermal runaway of the electrochemical cell 3.

In order to confirm a possible (potential) thermal runaway of an electrochemical cell 3, the control unit 8 compares the electric voltage $V_{stack}$ at the ends of the entire stack 2 of electrochemical cells 3 (in which the electrochemical cell 3 potentially in thermal runaway is found) measured by the measuring instrument 7 with the sum of the electric voltages $V_{cell-i}$ of all the electrochemical cells 3 which compose the stack 2 measured by the measuring instruments 6: if the difference (in absolute value) between the electric voltage $V_{stack}$ at the ends of the entire stack 2 of electrochemical cells 3 and the sum of the electric voltages $V_{cell-i}$ of all the electrochemical cells 3 which compose the stack 2 is greater than a threshold value TH2, then the control unit 8 diagnoses the breakage (malfunction) of one of the measuring instruments 6 but does not diagnose a possible thermal runaway in the electrochemical cells 3.

Obviously, also the breakage (malfunction) of one of the measuring instruments 6 prevents the correct operation of the electric battery 1 and thus it must be promptly reported and managed, but it does not cause (unlike a thermal runaway in the electrochemical cells 3) an immediate danger for the passengers of the vehicle in which the electric battery 1 is installed.

Whereas, if the difference (in absolute value) between the electric voltage $V_{stack}$ at the ends of the entire stack 2 of electrochemical cells 3 and the sum of the electric voltages $V_{cell-i}$ of all the electrochemical cells 3 which compose the stack 2 is smaller than the threshold value TH2, then the control unit 8 diagnoses a potential thermal runaway in the electrochemical cells 3 (not yet certain, since not yet confirmed by a further following verification described in the following).

According to a preferred embodiment, before diagnosing a thermal runaway in an electrochemical cell 3, the control unit 8 carries out a further control after the comparison between the electric voltage $V_{stack}$ at the ends of the entire stack 2 of electrochemical cells 3 and the sum of the electric voltages $V_{cell-i}$ of all the electrochemical cells 3 which compose the stack 2. In particular, the control unit 8 determines the maximum electric voltage $V_{stackmax}$ between the electric voltages $V_{stack}$ of all the stacks 2 and determines the minimum electric voltage $V_{stackmin}$ between the electric voltages $V_{stack}$ of all the stacks 2; subsequently, the control unit 8 compares the maximum electric voltage $V_{stackmax}$ (between all the stacks 2) with the minimum electric voltage $V_{stackmin}$ (between all the stacks 2) and only if their difference in absolute value is greater than a threshold value TH3, then the control unit 8 diagnoses an actual thermal runaway in an electrochemical cell 3. That is, if the difference (in absolute value) between the maximum electric voltage $V_{stackmax}$ (between all the stacks 2) and the minimum electric voltage $V_{stackmin}$ (between all the stacks 2) is smaller than the threshold value TH3, then the control unit 8 does not diagnose a thermal runaway in an electrochemical cell 3; whereas, only if the difference (in absolute value) between the maximum electric voltage $V_{stackmax}$ (between all the stacks 2) and the minimum electric voltage $V_{stackmin}$ (between all the stacks 2) is greater than the threshold value TH3, then the control unit 8 diagnoses a thermal runaway in an electrochemical cell 3.

Preferably, before "publishing" (i.e. making final by sending out the corresponding signalling and the corresponding recovery procedures) a thermal runaway in an electrochemical cell 3, the control unit 8 waits for a confirmation amount of time $\Delta T$ (in the order of 1-5 seconds) during which the electric anomalies have to remain present and steady (in this manner, it is prevented to mistakenly signal a thermal runaway in an electrochemical cell 3 by effect of temporary disturbances in the voltage measurements).

Figure 4:
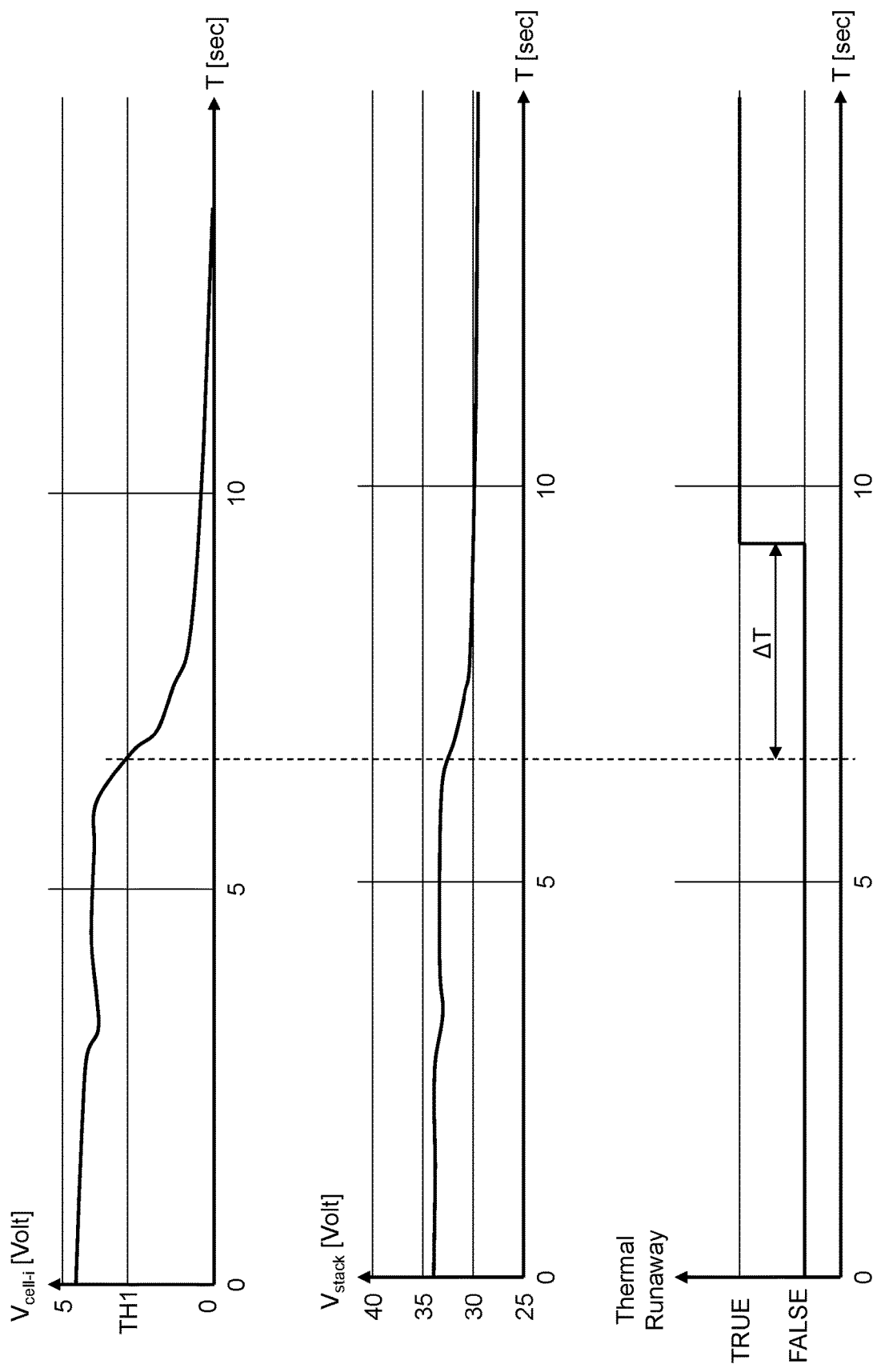
FIG. 4 illustrates the temporal evolution of some quantities of the stack of FIG. 2 in case of thermal runaway of an electrochemical cell.

An example of what described in the foregoing is shown in the graphs illustrated in FIG. 4, which illustrate the temporal evolution of an electric voltage $V_{cell-i}$ of an electrochemical cell 3 measured by a measuring instrument 6 which at a certain instant is smaller than the threshold value TH1, the temporal evolution of the electric voltage $V_{stack}$ at the ends of the entire stack 2 of electrochemical cells 3 measured by the measuring instrument 7, and the temporal evolution of the diagnosis of thermal runaway. Shown in FIG. 4 is the effect of the confirmation amount of time $\Delta T$ which delays the "publication" of the diagnosis of thermal runaway with respect to the evidence deriving from the electric voltages $V_{stack}$ and $V_{cell-i}$.

According to a different embodiment, before diagnosing the thermal runaway of an electrochemical cell 3, no comparison is carried out between the maximum electric voltage $V_{stackmax}$ (between all the stacks 2) and the minimum electric voltage $V_{stackmin}$ (between all the stacks 2); i.e. the thermal runaway of an electrochemical cell 3 is diagnosed only by comparing the electric voltage $V_{cell-i}$ of the electrochemical cell 3 with the threshold value TH1 and by subsequently comparing the electric voltage $V_{stack}$ at the ends of the entire stack 2 of electrochemical cells 3 (in which the electrochemical cell 3 potentially in thermal runaway is found) with the sum of the electric voltages $V_{cell-i}$ of all the electrochemical cells 3 which compose the stack 2.

According to a further embodiment not illustrated, the battery 1 could comprise a single stack 2; obviously, in this embodiment, before diagnosing the thermal runaway of an electrochemical cell 3 it is not possible to proceed with the comparison between the maximum electric voltage $V_{stackmax}$ (between all the stacks 2) and the minimum electric voltage $V_{stackmin}$ (between all the stacks 2) since a single stack 2 is present.

It is important to observe that the diagnosis of the possible onset of a thermal runaway in one of the electrochemical cells 3 is made only and exclusively based on the electric voltages $V_{cell-i}$ measured by the measuring instruments 6 and on the electric voltages $V_{stack}$ measured by the measuring instruments 7 and thus without using any thermal information (i.e. without using any temperature measurement).

The embodiments described herein can be combined together without departing from the scope of protection of the present invention.

The above-described diagnosis method has numerous advantages.

Firstly, the above-described diagnosis method allows diagnosing in an effective manner (i.e. without false negatives) the possible onset of a thermal runaway in one of the electrochemical cells 3; in fact, the above-described diagnosis method always allows recognising the possible onset of a thermal runaway in one of the electrochemical cells 3 since a thermal runaway necessarily causes a collapse of the electric voltage $V_{cell-i}$ of the electrochemical cell 3 in which the thermal runaway occurs.

Furthermore, the above-described diagnosis method allows diagnosing in an efficient manner (i.e. without false positives) the possible onset of a thermal runaway in one of the electrochemical cells 3; in fact, the above-described diagnosis method always allows distinguishing between a problem in the measuring instruments and an actual thermal runaway in one of the electrochemical cells 3.

Finally, the above-described diagnosis method is easy and cost-effective to implement, since it uses information which is generally already available and does not require a significant calculation power.

LIST OF THE REFERENCE NUMERALS OF THE FIGURES

1 electric battery
2 stack
3 electrochemical cells
4 container
5 terminals
6 measuring instruments
7 measuring instruments
8 control unit
$V_{stack}$ electric voltage
$V_{cell-i}$ electric voltage
$V_{stackmax}$ electric voltage
$V_{stackmin}$ electric voltage
TH1 threshold
TH2 threshold
TH3 threshold
ΔT confirmation amount of time

The invention claimed is:

1. A method for diagnosis of thermal runaway in an electric battery (1) comprising at least one stack (2) of electrochemical cells (3) connected to one another in series; the diagnosis method comprises the steps of:

measuring a first electric voltage ($V_{cell-i}$) at ends of each electrochemical cell (3);

measuring a second electric voltage ($V_{stack}$) at ends of the entire at least one stack (2) of electrochemical cells (3);

diagnosing a thermal runaway of an electrochemical cell (3), if the first electric voltage ($V_{cell-i}$) of the electrochemical cell (3) is smaller than a first threshold value (TH1);

calculating a difference between the second electric voltage ($V_{stack}$) and a sum of all first electric voltages ($V_{cell-i}$);

diagnosing a thermal runaway of an electrochemical cell (3), only if the difference between the second electric voltage ($V_{stack}$) and the sum of all first electric voltages ($V_{cell-i}$) is smaller than a second threshold value (TH2);

measuring all second electric voltages ($V_{stack}$) at the ends of each stack of a plurality of stacks (2) of electrochemical cells (3), identical to one another, making up the electric battery (1);

determining, among all second electric voltages ($V_{stack}$) at the ends of each stack of the plurality of stacks (2) of electrochemical cells (3), a maximum second electric voltage ($V_{stackmax}$) and a minimum second electric voltage ($V_{stackmin}$);

calculating a difference between the maximum second electric voltage ($V_{stackmax}$) and the minimum second electric voltage ($V_{stackmin}$); and diagnosing a thermal runaway of an electrochemical cell (3), only if the difference between the maximum second electric voltage ($V_{stackmax}$) and the minimum second electric voltage ($V_{stackmin}$) is greater than a third threshold value (TH3).

2. The diagnosis method according to claim 1 and comprising the further step of diagnosing an error in the measurement of the first electric voltages ($V_{cell}$-i), if the difference between the second electric voltage ($V_{stack}$) and the sum of all first electric voltages ($V_{cell-i}$) is greater than the second threshold value (TH2).

3. The diagnosis method according to claim 1 and comprising the further step of waiting for a confirmation amount of time (ΔT), during which the difference between the second electric voltage ($V_{stack}$) and the sum of all first electric voltages ($V_{cell-i}$) has to steadily remain smaller than the second threshold value (TH2), before making the diagnosis of a thermal runaway of an electrochemical cell (3) final.

4. The diagnosis method according to claim 1 and comprising the further step of diagnosing an error in the measurement of the first electric voltages ($V_{cell-i}$) if the difference between the maximum second electric voltage ($V_{stackmax}$) and the minimum second electric voltage ($V_{stackmin}$) is smaller than the third threshold value (TH3).

5. The diagnosis method according to claim 1 and comprising the further step of waiting for a confirmation amount of time (ΔT), during which the difference between the maximum second electric voltage ($V_{stackmax}$) and the minimum second electric voltage ($V_{stackmin}$) has to steadily remain smaller than the third threshold value (TH3), before making the diagnosis of a thermal runaway of an electrochemical cell (3) final.

6. The diagnosis method according to claim 1 and comprising the further step of diagnosing a thermal runaway of an electrochemical cell (3) only based on the first electric voltages ($V_{cell-i}$) and on the second electric voltage ($V_{stack}$), hence without using any thermal information.

7. An electric battery (1) comprising:

at least one stack (2) of electrochemical cells (3) connected to one another in series;

a first measuring instrument (6) for each electrochemical cell (3), which is configured to measure a first electric voltage ($V_{cell\text{-}i}$) at ends of the electrochemical cell (3);

a second measuring instrument (7), which is configured to measure a second electric voltage ($V_{stack}$) at ends of the entire at least one stack (2) of electrochemical cells (3); and a control unit (8), which is configured to diagnose a thermal runaway of an electrochemical cell (3), if the first electric voltage ($V_{cell\text{-}i}$) is smaller than a first threshold value (TH1);

wherein the control unit (8) is configured for the steps of: calculating a difference between the second electric voltage ($V_{stack}$) and a sum of all first electric voltages ($V_{cell\text{-}i}$); and diagnosing a thermal runaway of an electrochemical cell (3), only if the difference between the second electric voltage ($V_{stack}$) and the sum of all first electric voltages (Vcell-1) is smaller than a second threshold value (TH2); measuring all second electric voltages ($V_{stack}$) at ends of each stack of a plurality of stacks (2) of electrochemical cells (3), identical to one another, making up the electric battery (1); determining, among all second electric voltages ($V_{stack}$) at the ends of each stack of the plurality of stacks (2) of electrochemical cells (3), a maximum second electric voltage ($V_{stackmax}$) and a minimum second electric voltage ($V_{stackmin}$); calculating a difference between the maximum second electric voltage ($V_{stackmax}$) and the minimum second electric voltage ($V_{stackmin}$); and diagnosing a thermal runaway of an electrochemical cell (3), only if the difference between the maximum second electric voltage ($V_{stackmax}$) and the minimum second electric voltage ($V_{stackmin}$) is greater than a third threshold value (TH3).

\* \* \* \* \*